No. 856,007. PATENTED JUNE 4, 1907.
J. WENNSTROM.
JEWELED BEARING FOR ELECTRICAL AND OTHER INSTRUMENTS.
APPLICATION FILED FEB. 7, 1907.
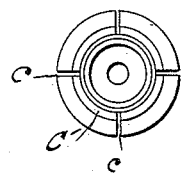
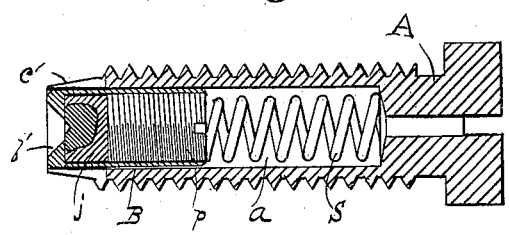
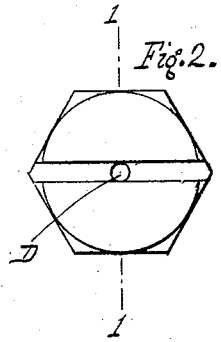
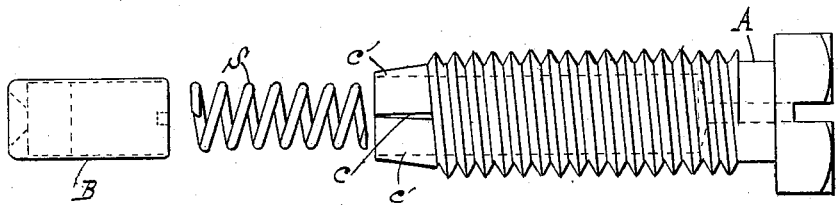
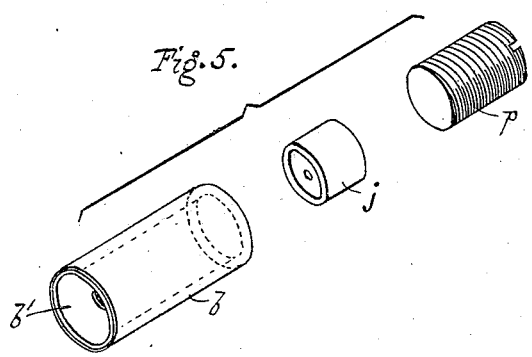
WITNESSES
INVENTOR
John Wennstrom
BY
Howson and Howson
ATTORNEYS

UNITED STATES PATENT OFFICE.

JOHN WENNSTROM, OF SUFFERN, NEW YORK.

JEWELED BEARING FOR ELECTRICAL AND OTHER INSTRUMENTS.

No. 856,007.      Specification of Letters Patent.      Patented June 4, 1907.

Application filed February 7, 1907. Serial No. 356,264.

*To all whom it may concern:*

Be it known that I, JOHN WENNSTROM, a citizen of the United States of America, residing at Suffern, in the county of Rockland and State of New York, have invented certain new and useful Improvements in Jeweled Bearings for Electrical and other Instruments, of which the following is a specification.

My invention relates to the construction of jeweled bearings for electrical, mathematical, and other instruments, and the object of my invention is to provide an improved bearing with an easily removed jewel, more particularly a bearing of that class in which the jewel or jeweled stub is spring-seated.

In the accompanying drawings Figure 1 is a longitudinal section, drawn to an enlarged scale, of a screw bearing embodying my invention, the section being taken on the line 1—1, Fig. 2; Figs. 2 and 3 are views of the opposite ends of the bearing screw; Fig. 4 is a side elevation, showing the jewel stub and spring withdrawn from the screw; and Fig. 5 is a perspective view of the stub with the jewel cup and retaining screw plug removed.

A is the headed screw, which is to carry the jewel and which is adapted to be screwed through a fixed part of the frame of the electric meter, or other electrical or mathematical or like instrument in which the jeweled bearing is required. This screw is made hollow throughout a considerable portion of its length to form a cylindrical chamber $a$ open at the nose of the screw to receive the jewel stub B and supporting spring S at the rear of the jewel stub.

At the nose of the screw the tubular walls are slit as shown at $c$ (Fig. 4) and the tongues $c^1$ thus formed, are bent inward so that the internal diameter of the mouth of the chamber $a$ is slightly less than the external diameter of the stub B. The tongues are sufficiently elastic to permit the stub to be pushed inward into place into the cylindrical chamber, and they will hold the stub with sufficient friction to prevent its coming out, except by the application of force, as by the insertion of an ejecting pin through a hole D (Fig. 1) in the head end of the screw. The spring S inserted in the chamber $a$ back of the jewel stub forms a spring seat for the latter against the end thrust of the spindle of the electric meter or other instrument for which this bearing is to be used.

The improved construction of the stub will be best understood by reference to Figs. 1 and 5. The stub B is formed of a tubular shell $b$ with an inwardly projecting flange $b^1$ at its forward end, and the cup $j$ carrying the jewel is inserted into the shell from the rear and is retained in place by a screw-plug $p$ screwed into the rear of the shell, which is internally threaded to receive the plug. The opening in the forward end of the stub shell is made of hollow conical form for the more ready insertion and guidance of the end of the spindle of the meter, etc. to the face of the jewel which has a recess formed in it to receive the point of the spindle.

The jewel itself may be a diamond, sapphire or any other jewel ordinarily employed or adapted for the purpose. Whatever precious stone is used, however, it is commonly necessary to take it out on occasions, as where its bearing face becomes pitted by the hard pointed end of the spindle for which it forms a bearing. With the ordinary construction of bearing screws, this was liable to involve a destruction of the screw and stub, because the jewel cup was put into the open front end stub, and the open end of the latter was then flanged over the jewel cup, and in like manner the stub was retained in the end of the screw by flanging the mouth end of the hollow screw over the edge of the stub.

With my improved construction, the jewel cup can be very easily got at for re-grinding or other repair and can be as easily put back again. For this purpose the bearing screw A is screwed back in its frame or out of the frame, and then a pin is inserted through the hole D in the head of the screw and the stub $b$ pushed out of the mouth of the screw against the frictional bearing of the spring jaws $c$. Then the plug $p$ is unscrewed and the jewel cup withdrawn from the rear, and the jewel reground or otherwise repaired. The cup with the repaired jewel or if necessary with a new jewel or a substitute jeweled cup is put back into the stub and secured in place by the plug $p$, and then the stub is re-inserted in the open end of the screw which can then be adjusted in the instrument.

I claim as my invention

1. A jeweled bearing, comprising a hollow screw with a jewel stub removably held in the mouth of the screw, and a supporting spring, the screw having means for frictionally holding the stub in place.

2. A jeweled bearing, comprising a hollow screw with spring jaws at the open end, a jewel stub frictionally held by the spring jaws and a supporting spring.

3. A jeweled bearing, comprising a hollow screw with a jewel stub removably held in the mouth of the screw and a supporting spring, the screw having means for frictionally holding the stub in place, and also having a hole through the screw head for the insertion of an ejecting pin.

4. The combination of a hollow bearing screw with a jewel-carrying stub mounted therein but readily removable from the open front end of the screw, and means for frictionally holding the stub in place.

In testimony whereof I have signed my name to this specification, in the presence of two subscribing witnesses.

JOHN WENNSTROM.

Witnesses:
   WALTER ABBE,
   HUBERT HOWSON.